United States Patent [19]

Kranz et al.

[11] Patent Number: 5,024,395
[45] Date of Patent: Jun. 18, 1991

[54] STEPPING MECHANISM FOR ROTARY MOTIONS

[75] Inventors: Walter Kranz, Taufkirchen; Heinz Tillmann, Riemerling, both of Fed. Rep. of Germany

[73] Assignee: Messerschmitt Bölkow-Blohm GmbH, Munich, Fed. Rep. of Germany

[21] Appl. No.: 363,342

[22] Filed: Jun. 6, 1989

Related U.S. Application Data

[63] Continuation-in-part of Ser. No. 144,327, Jan. 14, 1988, abandoned.

[30] Foreign Application Priority Data

Jan. 27, 1987 [DE] Fed. Rep. of Germany ....... 3702240
Jun. 6, 1988 [DE] Fed. Rep. of Germany ....... 3819190

[51] Int. Cl.$^5$ ............................................. F42B 15/033
[52] U.S. Cl. ............................... 244/3.22; 239/265.19; 60/230
[58] Field of Search ................... 244/3.22; 239/265.19, 239/265.11; 60/230, 228

[56] References Cited

U.S. PATENT DOCUMENTS

| 4,463,921 | 8/1984 | Metz | 244/3.22 |
| 4,589,594 | 5/1986 | Kranz | 244/3.22 |
| 4,681,283 | 7/1987 | Kranz | 244/3.22 |
| 4,691,876 | 9/1987 | Kranz | 244/3.22 |
| 4,763,857 | 8/1988 | Booth et al. | 244/3.22 |

Primary Examiner—Charles T. Jordan
Assistant Examiner—J. Woodrow Eldred
Attorney, Agent, or Firm—Kenyon & Kenyon

[57] ABSTRACT

The invention relates to a stepping mechanism for rotary motions with a driven switching wheel (9) which comprises at least one wheel-side stop (10), with an escapement mechanism having at least one pawl (12) which cooperates with said wheel-side stop, and with an actuating device (3, 17) for the pawl. Pursuant to the invention, a miniaturizable stepping mechanism is provided which is of a simple design and which permits reliable positioning of the switching wheel into preselected individual rotational positions. According to the invention, this is achieved in that the escapement mechanism of the stepping mechanism comprises a brake (20) displaceable under the action of force, with a run-up edge (21) lying in the region of each pawl (12) on to which the wheel-side stop (10) runs up before striking the pawl (12) to thereby displace the brake. Preferably, the brake and the pawls are arranged on a rocker (20, 13) for each, these being pivotable about a common rotary shaft (14) not lying in the axis of rotation (A) of the stepping mechanism. The stepping mechanism can be used for the control (i.e. steering) of missiles. To this end the switching wheel is preferably connected with a rotary nozzle body (1) which, via a thrust nozzle (8), delivers a propellant jet approximately in a radial direction.

21 Claims, 4 Drawing Sheets

STEPPING MECHANISM FOR ROTARY MOTIONS

This is a continuation-in-part of copending application Ser. No. 144,327 filed on Jan. 14, 1988, now abandoned.

BACKGROUND AND SUMMARY OF THE INVENTION

The invention relates to a stepping mechanism for rotary motions.

Stepping mechanisms are known for a plurality of uses. In this connection, it is often desirable to have available a simply functioning stepping mechanism which is miniaturizable to a high degree, which can be stepped at high speed, and which occupies exact stepped positions. From DE-PS 33 17 583 there is known, for example, a rotary nozzle arrangement, also miniaturizable to a high degree, which can be used for the control (e.g. steering) even of small-caliber shells. This rotary nozzle arrangement comprises a rotary nozzle body which is driven by the propellant stream, e.g. of a gas generator, continuously, at a high speed. The propellant stream issues from a thrust nozzle. The rotary nozzle arrangement is mounted in a missile so that the propellant stream is blown out approximately radially to the missile casing and hence exerts a steering force on the missile. The direction of the propellant stream can be defined with the aid of a brake which acts on the rotary nozzle body and can retain the latter in any desired position. The entire rotary nozzle arrangement can be miniaturized so that its diameter is in the millimeter range. Instead of using a brake for the retention of the rotary nozzle arrangement, also a stepping mechanism would be suitable which presets certain positions for the rotary nozzle body.

A stepping mechanism is known from U.S. Pat. No. 4,463,921. With this stepping mechanism, the position of a gas distributor is adjusted. The gas distributor communicates with blow-out ports at the circumference of the casing of a missile and through which a propellant stream of a gas generator is blown out in different, approximately radial directions for the steering of the missile. This known stepping mechanism, however, is relatively expensive as to design and is not miniaturizable to the desired degree.

It is the object of the present invention to provide a stepping mechanism for rotary motions which is miniaturizable to a high degree and which offers high setting speeds combined with the possibility of exact positioning.

According to the invention, the objective is achieved through a novel brake which is engaged and displaced by a wheel-side stop of a switching wheel prior to the rest position of the switching wheel, as will appear.

In the stepping mechanism of the invention, a continuous drive of the switching wheel is necessary. This continuous drive can take place e.g. by means of the above-mentioned rotary nozzle arrangement if the rotary nozzle body is connected coaxially with the drive shaft of the switching wheel. The continuous drive provides a very high stepping speed in the operation of the stepping mechanism. For the switching wheel, which carries at least one wheel-side stop, an escapement mechanism with at least one pawl is provided. To obtain exact positioning of the switching wheel and an optimally delayed entry of the switching wheel into the respective stepped position, there is provided, in the region of the pawl, a brake with a run-up edge on which the wheel-side stop of the switching wheel runs up before its entry into the final stepped position. The brake is thereby displaced and the switching wheel is delayed in entering into the final stepped position. Preferably, the braking action, i.e. the force needed to displace the brake, is adjustable, e.g. by means of compression springs or by magnetic pressing, in that the brake is arranged between the pawl and a magnet. Depending on the strength of the magnet, the brake will be pressed more or less against the magnet or a friction disk, and the braking force is thereby adjustable.

To obtain a dynamically balanced operation of the stepping mechanism, the escapement mechanism preferably comprises two pawls located on opposite sides of the switching wheel and also two brakes. The pawls, as well as the two brakes can be formed by a rocker, both of which are pivotable about a common axis. The axis here lies in the center between the pawls or the run-up edges, respectively. As a result, practically no imbalances occur during operation.

The escapement mechanism can be brought into the required position by an external actuating device, but it is advantageous to utilize for this purpose, at least in part, the drive force for the switching wheel, which is available anyway. The wheel-side stops and the pawls are formed so that, during the abutment of a wheel-side stop, a force acts on a pawl which force pressurizes the pawl in the direction of release of the wheel-side stop. A releasable holding device must then also be provided for the pawl. If the pawl is thereby released, it is pushed away by the wheel-side stop, the wheel-side stop being released. If then, e.g., two pawls are provided jointly on a rocker, the other pawl can thereby be brought into a position in which a wheel-side stop is retained in the next stepped position. The actuation of the pawl by the drive force can be further supported by a compression spring.

On the same principle also, the brake can be positioned accordingly by the switching wheel, in particular, if the brake is designed as a rocker with two opposite run-up edges. To obtain an exact positioning of the pawls, fixing means may be provided in which the pawl is retained in the desired two positions in each instance. Such fixing can occur for instance, by means of lock balls.

The masses to be moved in the stepping operation of the stepping mechanism are very small, so that, on the whole, a stepping mechanism with small inertia is made possible.

It is also an objective of the present invention to provide a straight forward design for a stepping switch, of the type described above, which functions with few component parts.

This objective is achieved according to a further embodiment of the present invention, by providing two connecting links, a pawl link and a clamping link, which move in simple shifting movements, into respective two switching positions, perpendicular to the axis of rotation of the rotary operating mechanism. This provides the use of simple bearing and guide means for the connecting links, for example with the use of pins and slotted holes. The spring supported movement of the pawl link is accomplished with the help of an annular spring, which encircles both connecting links and abuts against only one of the connecting links, at any one time, on opposite sides in the area of the guide means. This annular spring is deformed by the clamping link, which is actuated by the ratchet wheel, and is thereby tensioned, so that it exerts a force, in the direction of the axis of rotation of the rotary operating mechanism, on the pawl link, which is retained in one switching position. If the pawl link is released, it is then shifted by the annular spring into the other switching position, in which it now abuts against the annular spring on the opposite side. When the ratchet wheel is rotated further, the clamping link is simultaneously pressed into the other switching position, so that it again lies on the now other side of the annular spring, and tensions it once more with deformation. This exchange cycle repeats itself.

In the case of the stepping switch, according to the further embodiment of the present invention, it is not essential that any self-arresting action occurs during the operation of the escapement mechanism. On the contrary, the pawls and the end stops on the ratchet wheel can be made conventionally, so that self-arresting action occurs. Of course, a functioning without self-arresting action is also possible, whereby as in the case of the above described embodiment of the invention, the shifting of the pawl link into the other switching position, at the time, is supported by the ratchet wheel.

The escapement mechanism of the stepping switch according to the further embodiment of the invention, features only three simple component parts, namely the two plate-shaped connecting links, as well as an annular spring. These parts are simple to manufacture, so that, to a great extent, the stepping switch can be miniaturized.

The invention will now be described in greater detail in the following detailed description with reference to the accompanying drawings.

BRIEF DESCRIPTION OF THE DRAWINGS

FIG. 7 is a lateral section through a stepping switch, according to a further embodiment of the invention;

FIG. 8 is a front view of an escapement mechanism in a stepping switch, according to the further embodiment of the invention, with a pawl link, a clamping link and an annular spring;

FIG. 9 is an exploded perspective view of the stepping switch of FIG. 7;

FIG. 10 illustrates yet another embodiment of an escapement mechanism, according to the invention, including two annular springs.

DETAILED DESCRIPTION

Figure 1:
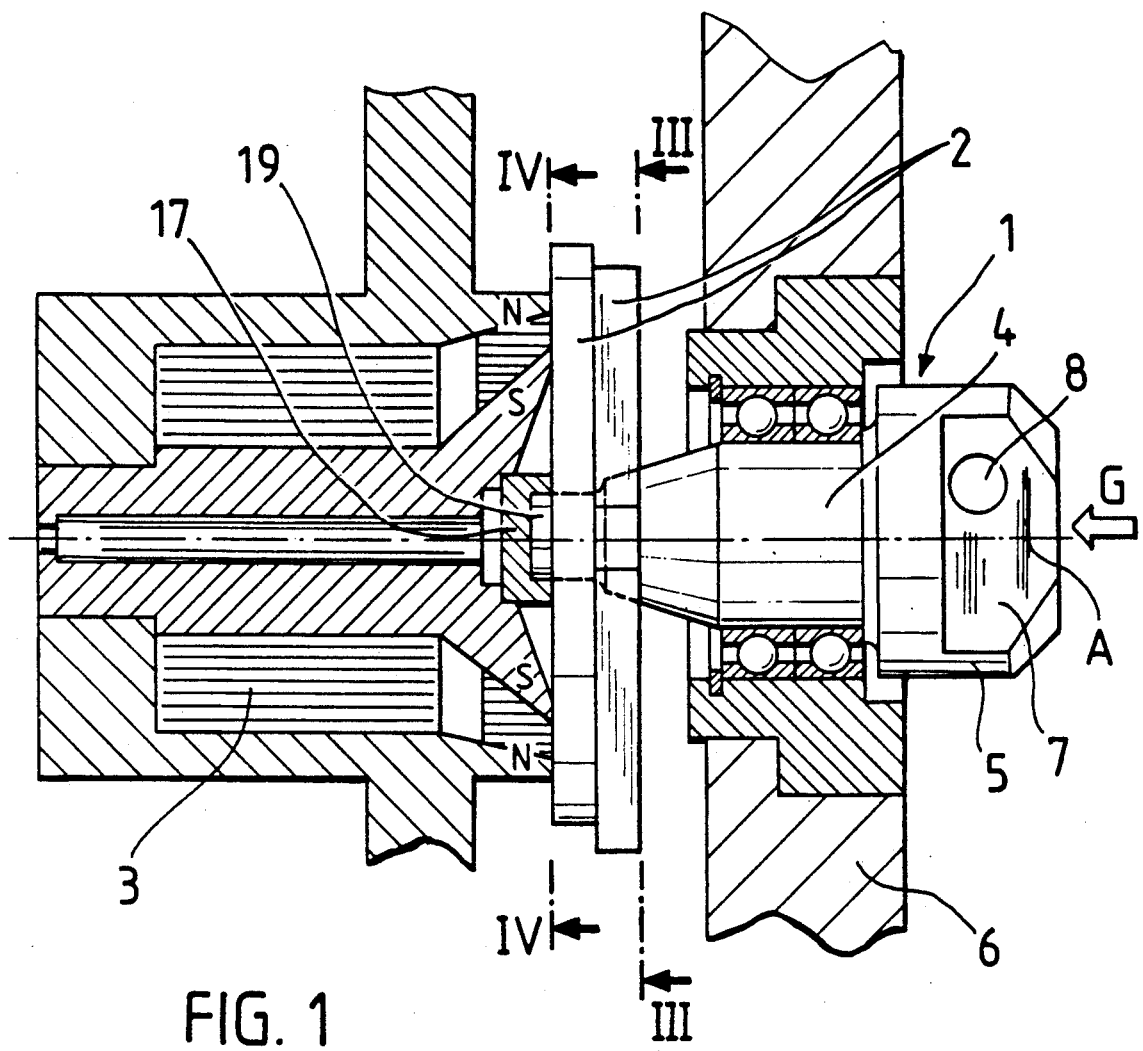
FIG. 1 is a longitudinal section through a stepping mechanism according to the invention with a switching wheel, an escapement mechanism and a pot magnet, the switching wheel being connected with a rotary nozzle body.
Figure 2:
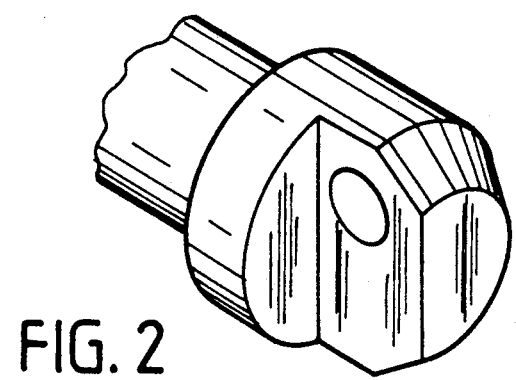
FIG. 2 is a perspective partial view of the rotary nozzle body.

In FIG. 1, the reference numeral 1 denotes a rotary nozzle body, 2 a stepping module, and 3 an electrically actuated pot magnet, which together form a stepping mechanism. This stepping mechanism is installed, for instance, in a missile and serves for the control (i.e. steering) thereof. The rotary nozzle body consists of a neck portion 4 and a head portion 5 and is rotatably mounted in a wall 6 of the missile. In the head portion 5, a recess 7 open on the front of the rotary nozzle body is provided, from which there originates a thrust nozzle 8 which traverses the wall of the head portion 5. Flowing into the recess 7 is a propellant, e.g. hot gas, from a gas generator (not specifically illustrated). This propellant is represented schematically by an arrow and G. The propellant is blown off through the thrust nozzle 8, namely so that there results a thrust jet, the thrust direction of which does not pass through the axis of rotation A of the rotary nozzle body. A torque is thereby exerted on the rotary nozzle body 1, so that the rotary nozzle is set in rapid rotation about the axis of rotation without impediment.

Figure 3:
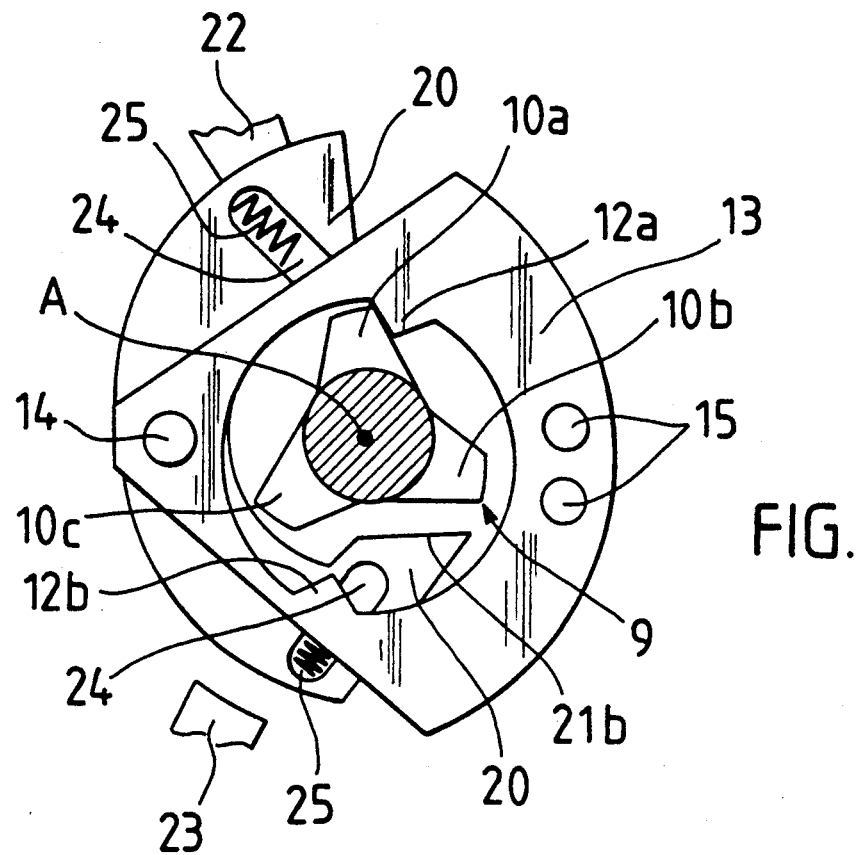
FIG. 3 is a view onto the stepping mechanism along line III—III of FIG. 1.
Figure 4:
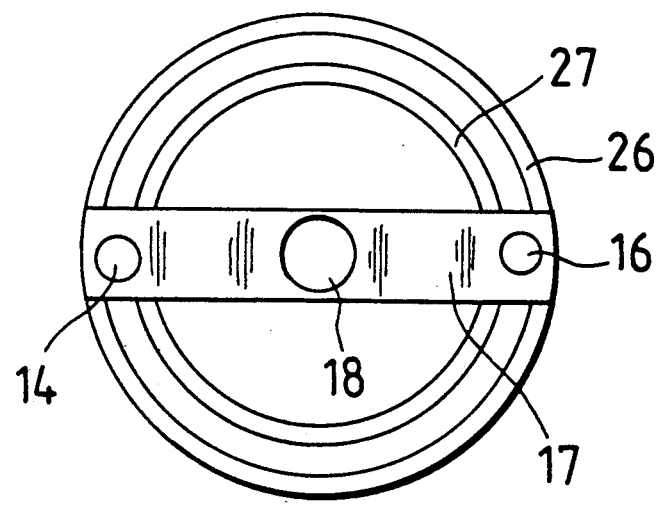
FIG. 4 is a view onto parts of the stepping mechanism and of the pot magnet along line IV—IV of FIG. 1.

By the end of its neck portion 4, the rotary nozzle body 1 is firmly connected with a switching wheel 9 disposed in the stepping module 2. As can be seen from FIG. 3, this switching wheel 9 comprises three stops 10a, 10b and 10c, arranged at angular distances of 120° each. The wheel-side stops 10a to 10c cooperate with two opposite pawls 12a and 12b of a pawl rocker 13. This pawl rocker 13 embraces the switching wheel and is mounted laterally on a rotary shaft 14. The rotary shaft 14 is parallel to the axis of rotation A of the switching wheel. On the side opposite the rotary shaft 14, the pawl rocker 13 has two recesses 15, into which a detent ball 16 can engage which lies on a beam bracket 17. This beam bracket 17 is situated on the side of the stepping module 2 toward the pot magnet 3, is mounted on the rotary shaft 14, and is fixed in its position by the arrangement of a bore 18 coaxial to the axis of rotation A through which the bracket 17 embraces an axle stub 19 of the stepping module 2. This axle stub 19 may be e.g. an extension of the neck portion 4 of the rotary nozzle body 1. The recesses 15 in the pawl rocker 13 are situated so that in both positions of the pawl rocker 13 one of the two pawls 12a or 12b can come in engagement with one of the wheel-side stops 10. In FIG. 3, as well as in FIG. 5a, the wheel-side stop 10a applies against pawl 12a; in the other position of the pawl rocker 13, the wheel-side stop 10b can run up onto the pawl 12b, as shown in FIGS. 5b and 5e. The pawl rocker 13 is stamped from a thin magnetic sheet.

On the bottom of the stepping module 2, between the pawl rocker 13 and the pot magnet 3, a brake rocker 20 is mounted. The brake rocker 20 is also stamped from a magnetic sheet and has more or less the form of a half annulus. The brake rocker 20 is centered and mounted on the rotary shaft 14. At both its ends the brake rocker 20 has teeth pointing inwardly in the direction of the axis of rotation A, which teeth are provided with a run-up edge 21a, 21b. These run-up edges 21a, 21b are situated in the vicinity of the pawls 12a, 12b. Just as the pawl rocker 13, the brake rocker 20 swings between two positions, for which appropriate stops 22 and 23 are provided. In the region of the teeth 21 of the brake rocker 20 there are further provided guide slots 24 for a compression spring 25, which takes support at one end on the bottom of the respective guide slot and by its other end on the outer edges of the pawl rocker 13.

Contiguous to the stepping module 2 is the pot magnet 3, the ring poles of which are marked 26 and 27. The position of the ring poles 26 and 27 and the form of the pawl rocker 13 and of the brake rocker 20 are matched in such a way that the outer ring pole 26 runs approximately along the outer edge of the pawl rocker 13 and of the brake rocker 20, while the inner ring pole 27 runs along the inner edge of the pawl rocker and brake rocker, respectively. In addition, the wheel-side stops 10a to 10c of the switching wheel 9, the pawls 12a and 12b, as well as the run-up edges 21a and 21b are arranged so that the wheel-side stops can cooperate both with the pawls and with the run-up edges. Further, the stop edges of the wheel-side stops 10a to 10c as well as of the pawls 12a and 12b are formed so that when a wheel-side stop runs off from a pawl, the pawl rocker 13 is pushed out of the respective holding position toward the respective other position, both positions being determined by the engagement of the detent ball 16 in recess 15.

The operation of the described stepping mechanism will be explained with reference to FIGS. 5a to 5e.

Figure 5A:
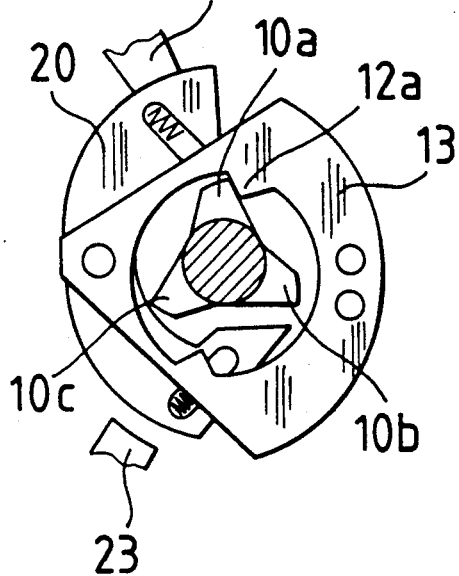
FIGS. 5a to e illustrate five different positions of the stepping mechanism.
Figure 5B:
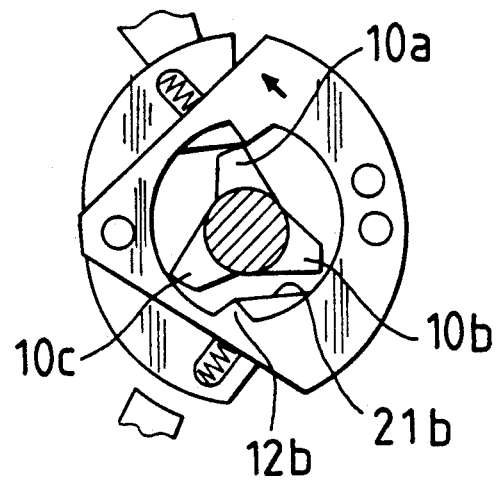
Figure 5C:
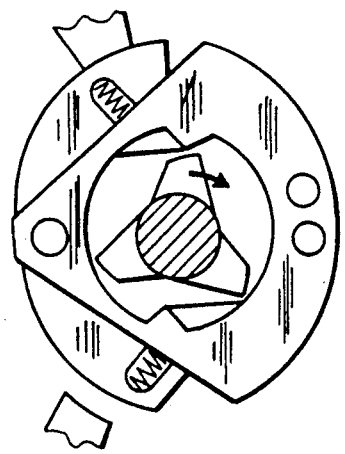
Figure 5D:
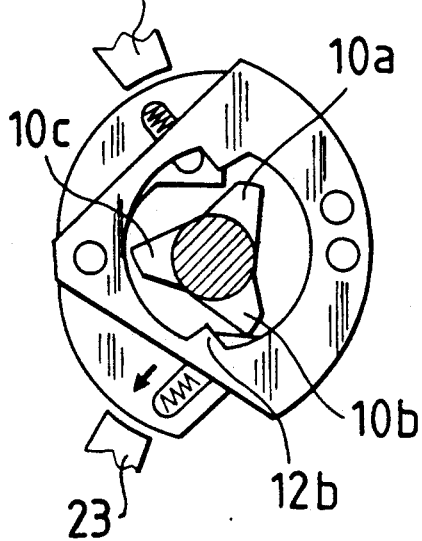
Figure 5E:
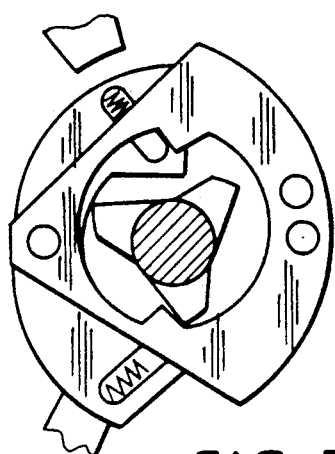

In one holding position, as illustrated in FIG. 5a, the wheel-side stop 10a applies against pawl 12a of the pawl rocker 13; the brake rocker 20 is pressed by the wheel-side stop 10a against its stop 22. The pot magnet 3 is energized, so that the pawl rocker 13 is attracted and retained by the ring poles 26 and 27. The holding force is greater than the rotary force acting on the switching wheel as a result of the rotary nozzle body being supplied with the propellant. If the pot magnet is now deenergized, the switching wheel begins to rotate, in this case clockwise, pushing the pawl rocker 13 upward counterclockwise in the figure. The moment when the wheel-side stop 10a runs off the tip of pawl 12a is illustrated in FIG. 5b. The pivoting motion of the pawl rocker 13 counterclockwise is supported by what in the figure is the lower compression spring 25. At the same time the lower pawl 12b is thereby brought into a position relative to the brake rocker 20 in which the run-up edge 21b of rocker 20 lies in the direction of rotation of the switching wheel—in front of the pawl and extends to the tip of pawl 12b. The brake rocker 20 is thereby pivoted clockwise and owing to its inertia brakes the switching wheel 9. The start of the run-up of the wheel-side stop 10b onto the run-up edge 21b is illustrated in FIG. 5c. Upon further rotation of the switching wheel 9 according to FIG. 5d, the brake rocker 20 is pivoted clockwise by the contact of the wheel-side stop 10b with the run-up edge 21b, until according to FIG. 5e the brake rocker applies against the lower stop 23. In this position then also the braked wheel-side stop 10b strikes against the pawl 12b. During the pivoting of the brake rocker, the upper compression spring 25 in the figures is tensioned. In the meantime the pot magnet 3 has been energized again, so that it retains the pawl rocker 13, and the position per FIG. 5e determines the new rotational position of the stepping mechanism.

If the stepping mechanism is to be actuated anew, the pot magnet is again deenergized, so that the pawl rocker 13 is pivoted clockwise again into the starting position per FIG. 5a, the run-up edge 21a being then in the corresponding brake position again with respect to pawl 12a, as is shown in FIG. 5c. The pivoting movement of pawl rocker 13 is now supported by the upper compression spring 25.

With the illustrated stepping mechanism six fixed rotational positions of the switching wheel can be obtained, at angular distances of 60°. If the number of wheel-side stops is greater, naturally additional rotational positions can be obtained.

The braking forces exerted by the brake rocker 20 on the switching wheel when a wheel-side stop runs onto one of the run-up edges are preferably brought about solely by the inertia of the brake rocker. This ensures that the wheel-side stops will always run into the end position up to abutment on a pawl. This braking force, however, can be increased, e.g. adjusted to a base force, or even varied. This can be done in several ways. If the brake rocker itself is of magnetic material, the braking force can be influenced by the attraction force of the pot magnet and can thus also be varied. Further, a friction force can act on the brake rocker, e.g. by appropriate friction linings of the brake rocker or by pressurization with springs or other dampers. In this case, of course, the brake rocker need not be of magnetic material. The braking force should, however, be increased only to a base force for which it is assured that a wheel-side stop will always run into the end position to abutment on a pawl.

Figure 6:
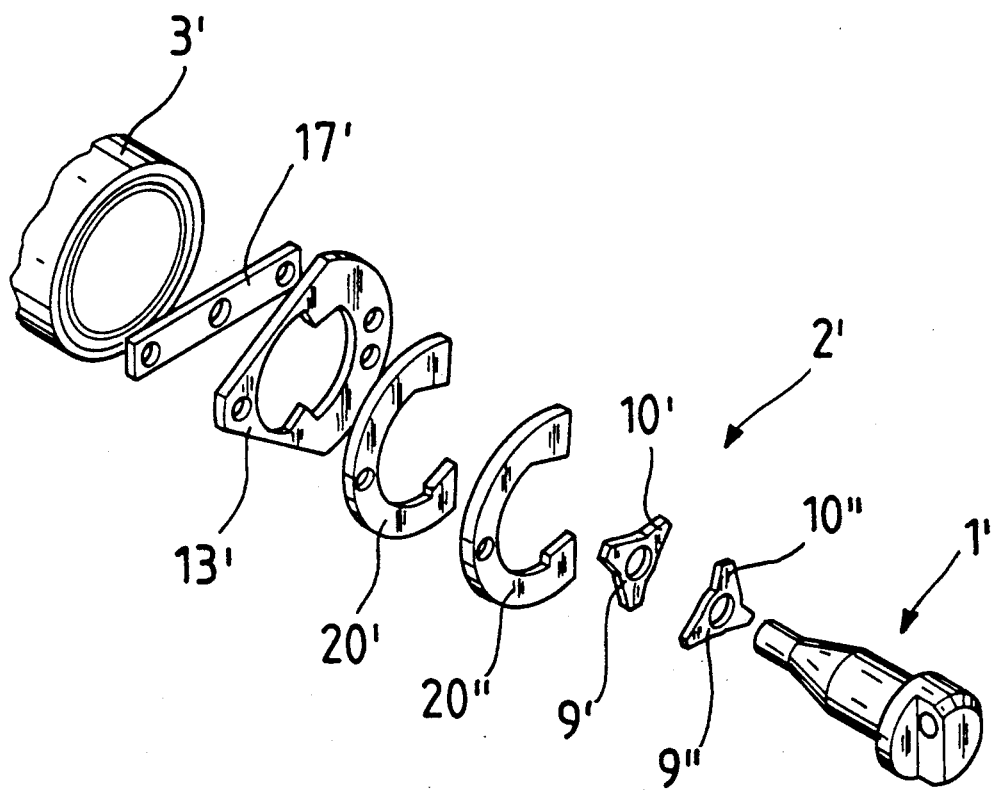
FIG. 6 is a perspective, exploded view of a further embodiment of a stepping mechanism according to the invention with two coupled switching wheels, two brake rockers and a pawl rocker.

In FIG. 6 an exploded view of the essential parts of an additional stepping mechanism is illustrated. It differs from the above described embodiment in that the stepping module 2' comprises two switching wheels 9' and 9" firmly connected together, which in turn comprise two sets of wheel-side stops 10', 10". The two switching wheels are of the same design but are rotated relative to each other by 180°. Both switching wheels are again firmly coupled with a rotary nozzle body 1'. The stepping module 2' again comprises one pawl rocker 13', but two brake rockers 20' and 20". Pawl rocker 13' is structurally identical with the above described design and the brake rockers 20' and 20" are identical in design with the above described brake rocker 20. The brake rockers 20' and 20", however, lie in front of the pawl rocker 13', so that the latter abuts directly on the pot magnet 3'. For the positioning of the pawl rocker 13' again a brake bracket 17' with appropriate detent balls, is provided. The switching wheel 9' toward the pot magnet 3' cooperates with the pawl rocker 13' and with the brake rocker 20', as has been described above. The brake rocker 20" cooperates only with the switching wheel 10" turned toward the rotary nozzle body 1', namely so that, whenever the brake rocker 20' is displaced by a stop 10' of the switching wheel 9', the brake rocker 20" is pivoted oppositely to the brake rocker 20' by a stop 10" of switching wheel 9' located exactly opposite.

This has the following advantage: In the first embodiment there is exerted on the switching wheel upon run-up on one of the run-up edges of the brake rocker a force in the direction of the axis of rotation of the switching wheel. This may cause imbalances, especially if the stepping mechanism is highly miniaturized. These shocks in the direction of the axis of rotation are compensated by counter-forces that are generated by the run-up of a wheel-side stop 10" of switching wheel 9" onto the run-up edge of the second brake rocker 20" on the respective opposite side. Thereby an absolutely true running of the stepping mechanism is ensured. As in the above embodiment, the braking force of the brake rockers 20' and 20" can be preset to a certain value, e.g. by pressurization with compression springs. Here, too, it must be ensured that the switching wheel 9' always runs into the end position.

In the described operation of the two stepping mechanisms the pawl rocker was held in its position by the force of the pot magnet. It is possible also to let a permanent magnet supply this holding force. For release of the rocker, the pot magnet need then be energized only briefly with a pulse by which the holding force of the permanent magnet is reduced. With such a design, a stepping mechanism of low energy consumption is possible. Besides, the coils of the pot magnet can be correspondingly small, as they no longer need to supply the actual holding force and will not heat up.

In FIG. 7, a rotary nozzle body is designated with 101, an escapement mechanism with 102, and an electrically actuated pot magnet with 103; which together form a stepping switch. The stepping switch is, for example, installed in a missile, which it serves to control. The rotary nozzle body 101 consists of a neck piece 104 and a headpiece 105, and is rotatably supported in a wall 106 of the missile. An open recess 107 is provided in the headpiece 105, on the front end of the rotary nozzle body 101. A propelling nozzle 108 leads out from this recess and penetrates the wall of the headpiece 105. A propellant, for example hot gas, from a gas generator (not shown) flows into the recess 107. This propellant is discharged through the propelling nozzle 108, so that a propelling jet results, with a direction of thrust, which does not run through the axis of rotation A of the rotary nozzle body 101. An angular momentum is thereby exerted on the rotary nozzle body 101, setting it into a fast rotation, with no retardation, around the axis of rotation A.

A shaft 109 is connected to the neck piece 104 of the rotary nozzle body 101, coaxially to the axis of rotation. A clamping wheel 110 and a ratchet wheel 111, which are directly joined together, are attached to the shaft 109. The clamping wheel 110 and the ratchet wheel 111 can also be manufactured as a single component part. As illustrated in FIG. 8, the ratchet wheel 111 has three end stops 112a, 112b and 112c, which are arranged around its circumference at angular distances of 120°. The clamping wheel 110 includes cams 113, which are aligned with the three end stops 112a to 112c of the ratchet wheel 111, respectively.

Two connecting links, including a clamping link 114 and a pawl link 115, work together with the clamping wheel 110 and the ratchet wheel 111, respectively, as will be described. The plate-shaped clamping link 114 includes a ring area 116, which encircles the ratchet wheel and has two outwardly extending lugs 117 on opposite sides. Two slotted holes 118 are formed in the lugs 117, perpendicular to the axis of rotation A, and guide pins 119 are received in the slotted holes. The clamping link 114 can be shifted back and forth, perpendicular to the axis of rotation A, between an upper switching position, as shown in FIG. 7, and a lower switching position. The clamping link 114 includes two cams 120 on the inner circumference of the ring area 116, which lie on opposite sides of the clamping wheel 110, in the shifting direction of the clamping link, and which work together with the cams of the clamping wheel 113.

The pawl link 115 is of a similar construction and includes a ring area 121, which encircles the ratchet wheel and has two lugs 122, as well as slotted holes 123 formed therein, in which the guide pins 119 likewise engage. Two pawls 124a and 124b are mounted on the inner circumference of the ring area. They work together with the pawls 112a to 112c of the ratchet wheel 111.

The clamping link 114 and the pawl link 115 are surrounded by an annular spring 125, which has a width corresponding to the thickness of both pawls, as illustrated in FIG. 7. In each switching position of the escapement mechanism, the annular spring abuts against a lug of one connecting link, on the one side, and against a lug of the other connecting link, on the other side. In FIGS. 7 and 8, the clamping link 114 is in the upper switching position and the pawl link 115 is in the lower switching position, so that the annular spring 125 abuts against the upper lug 117 of the clamping link 114 and against the lower lug 122 of the pawl link 115. The annular spring 125 is deformed and exerts a force, which acts on both connecting links in the direction of the axis of rotation A.

The poles of the pot magnet 103 are directed toward the pawl link 115. The pawl link 115 can be retained in its current switching position by switching on the pot magnet 103 or it can be released, by switching off the pot magnet. Other magnetic systems can also be used, such as, for example, two magnets or a polarized magnetic system. With an appropriate formation of the poles in the magnetic arrangement, the pawl link is retained either by a magnetic force or, as in the case of the present embodiment, by the magnetic force and, for the most part, by the frictional force between the poles and the pawl link 115. Of course, it is also possible to use other retaining and releasing devices for the pawl link 115.

The described stepping switch functions as follows:

In the switching position of the stepping switch depicted in FIGS. 7 and 8, the end stop 112a of the ratchet wheel 111 abuts against the upper pawl 112a of the connecting link 115, which is retained in its lower switching position with the help of the pot magnet 103. Its lower lug 122 abuts against the inner circumference of the annular spring 125. The cam 113 of the clamping wheel 110, which is aligned with the end stop 112a on the ratchet wheel, abuts against the upper cam 120 of the clamping link, so that this clamping link is pushed into its upper switching position and, with its upper lug 117, abuts against the annular spring 125. The annular spring 125 is deformed by the lugs 117, 122 and consequently tensioned against both connecting links, as shown.

If the pot magnet 103 is switched off, then the pawl link 115 is released. The pawl link in FIG. 8 is pushed upwards by the force of the annular spring 125 toward the opposite switching position. As soon as the pawl 124a of the pawl link 115 comes off the end stop 112a, the ratchet wheel 111 and the clamping wheel 110 in FIG. 8 are released to rotate counter clockwise. At this moment, however, the upper lug 122 of the pawl link abuts against the upper inner circumference of the annular spring 125. The pawl link is retained, by again turning on the pot magnet 103. Instead of turning the magnet on and off, this switching operation can be replaced by reversing the voltage on the magnet. When the ratchet wheel 11 continues to turn and rotate 60°, its end stop 112b runs up against the advancing pawl 124b, now moved inwards, of the pawl link 115, so that the rotary motion is once again interrupted. However, the cam 113 of the clamping wheel, which is aligned with the end stop 112b, also runs up against the lower cam 120 of the clamping link 114, so that the clamping link is pushed downwards and, with its lower lug 117, is positioned against the annular spring 125, and again deforms and tensions the spring 125.

This working cycle repeats itself when the pot magnet 103 is actuated again, so that now the end stop 112c of the ratchet wheel 111 abuts against the upper pawl 124a of the pawl link. The two connecting links are then situated once again in the initial state, as shown in FIG. 8.

In the illustrated embodiment, when the ratchet wheel runs into the next stopping position, it is already braked as a result of the shifting of the clamping link into the other switching position, so that the current end stop of the ratchet wheel runs up smoothly against the assigned pawl of the pawl link 115. In this case, additional measures can still be taken to intensify the cushioning effect, when the ratchet wheel runs into the stopping position.

Another specific embodiment of an escapement mechanism 102 is shown in FIG. 10. This specific embodiment differs from the escapement mechanism of FIGS. 7 and 8, only in that two superposed annular springs 125a and 125b are provided, instead of one annular spring. The other component parts as well as the functioning of the escapement mechanism remain the same. With this type of spring arrangement, the spring characteristic can be influenced accordingly. Furthermore, it is possible to insert an attenuator 131 between the two annular springs 125a and 125b, at least in their upper and lower contact areas, above or below the guide pins 19. The shifting of the clamping link 114 by the clamping wheel into the other switching position can be, hereby, damped accordingly, as a result of energy absorption in the attenuator 131, so that the end stops on the side of the wheel run up smoothly against the assigned pawls of the pawl link 115.

With good spring qualities, the annular springs used for the escapement mechanisms can have a small and compact design. They are easy to replace and especially guarantee a symmetry with regard to the movements of both connecting links into the switching positions.

What is claimed is:

1. A stepping mechanism for rotary motions, which comprises:
    (a) a switching wheel including at least one wheel-side stop,
    (b) means for providing a continuous drive force on said switching wheel,
    (c) at least one pawl arranged for operative engagement with said wheel-side stop of said switching wheel,
    (d) an actuating device for controlling said operative engagement between said pawl and said wheel-side stop, and
    (e) a displaceable brake element having at least one run-up edge positioned proximate to said pawl and arranged such that said wheel-side stop engages said run-up edge and displaces said brake element prior to said operative engagement between said wheel-side stop and said pawl caused by said actuating device.

2. The stepping mechanism according to claim 1, wherein
    (a) two pawls are arranged on opposite sides of said switching wheel, said pawls being securely mounted by a pawl rocker,
    (b) said pawl rocker being pivotally mounted upon a shaft for pivoting movement into two positions,
    (c) said two positions being arranged such that only one of said two pawls is in engagement with said wheel-side stop at one time, and
    (d) said brake element comprises a brake rocker mounted on said shaft and including two opposite run-up edges, each located in the region of one of said two pawls, said brake rocker being alternately pivotable about said shaft into two positions when said wheel-side stop engages one of said run-up edges and displaces said brake element prior to engagement with a respective one of said two pawls.

3. The stepping mechanism according to either of claims 1 or 2, wherein said wheel-side stop and said pawl are arranged and configured such that the pawl on which said wheel-side stop abuts is subject to a force acting in a direction to release the switching wheel, and further a releasable holding device for releasably holding said pawl in a preselected position.

4. The stepping mechanism according to claim 3, wherein said holding device comprises a magnetic circuit in which said pawl is part of a magnet armature.

5. The stepping mechanism according to claim 2 wherein:
    (a) each of said pawl rocker and said brake rocker are formed as plate-shaped elements and are arranged directly one behind the other on said shaft,
    (b) at least said pawl rocker being made from a magnetic material, and
    (c) an electromagnet having poles which lie in a plane which is parallel to the plane of said pawl rocker.

6. The stepping mechanism according to claim 5, wherein said brake rocker is arranged between said pawl rocker and said electromagnet.

7. The stepping mechanism according to claim 5, wherein said brake rocker is arranged on a side of said pawl rocker which is facing away from said electromagnet.

8. The stepping mechanism according to claim 1 wherein the force necessary for displacing the brake element is adjustable.

9. The stepping mechanism according to claim 1 including two switching wheels and two brake elements, one of said brake elements being associated with each of said switching wheels, said two switching wheels being arranged such that opposite forces act on said switching wheels when their respective wheel-side stops engage the associated brakes.

10. The stepping mechanism according to claim 1 and further a rotary nozzle body connected to said switching wheel and operable to receive a propellant jet, said propellant jet directed approximately radially to an axis of rotation of said switching wheel.

11. The stepping mechanism according to claim 10, wherein said propellant jet provides a rotary drive to said rotary nozzle body to rotate said switching wheel.

12. In a stepping switch for a rotary operating mechanism and a ratchet wheel including at least one end stop, the ratchet wheel being driven by the rotary operating mechanism, an escapement mechanism for the ratchet wheel, the escapement mechanism comprising:
    a pawl link arranged to encircle the ratchet wheel and including pawls disposed on opposite sides of the ratchet wheel to interact with the at least one end stop of the ratchet wheel;
    the pawl link being controllably movable between first and second switching positions such that in each one of the first and second switching positions one pawl of the pawl link is engaged with one of the at least one end stop of the ratchet wheel;

a clamping link arranged adjacent to the pawl link to interact with the ratchet wheel to be controllably moved between first and second clamping positions;

an annular spring arrangement arranged to encircle and engage each of the pawl link and the clamping link;

a retain and release mechanism operatively associated with the pawl link to controllably hold and release said pawl link in and from one of the first and second switching positions;

each of said pawl link and said clamping link being movably mounted in guide means for controlled movement between the first and second switching positions and first and second clamping positions, respectively;

wherein the clamping link, when in one of the first and second clamping positions, abuts against, deforms and tensions the annular spring arrangement such that the tensioned annular spring arrangement engages and exerts a force upon the pawl link in a direction toward the axis of rotation of the rotary operating mechanism and opposite to a current switching position of the pawl link.

13. The stepping switch of claim 12, wherein the pawl link includes two opposite advancing pawls extending in a shifting direction of the pawl link between the first and second switching positions.

14. The stepping switch of claim 12, wherein the clamping link includes two cams on opposite sides, each extending in a shifting direction between the first and second clamping positions, said cams interacting with cam surfaces formed on the ratchet wheel, which cam surfaces are aligned with the at least one end stop of the ratchet wheel.

15. The stepping switch of claim 12 wherein the pawl link and clamping link each include a ring area which, at any one time, encircles the ratchet wheel, each ring area being formed to include outwardly extending lugs on opposite sides thereof, each of the lugs having slotted holes and common guide pins received in adjacent slotted holes of the adjacent pawl link and clamping link.

16. The stepping switch of claim 12 wherein the annular spring arrangement comprises a plurality of superposed annular springs.

17. The stepping switch of claim 16, wherein the spring arrangement includes two annular springs.

18. The stepping switch of claim 17, wherein an attenuator is inserted between the annular springs.

19. In a stepping switch for a rotary operating mechanism and a ratchet wheel including at least one end stop, the ratchet wheel being driven by the rotary operating mechanism, an escapement mechanism for the ratchet wheel, the escapement mechanism comprising:

a pawl link arranged to encircle the ratchet wheel and including pawls disposed on opposite sides of the ratchet wheel to interact with the at least one end stop of the ratchet wheel;

the pawl link being controllably movable between first and second switching positions such that in each one of the first and second switching positions one pawl of the pawl link is engaged with one of the at least one end stop of the ratchet wheel;

a clamping link arranged adjacent to the pawl link to interact with the ratchet wheel to be controllably moved between first and second clamping positions;

a spring arrangement coupled between the pawl link and the clamping link;

a retain and release mechanism operatively associated with the pawl link to controllably hold and release said pawl link in and from one of the first and second switching positions;

wherein the clamping link, when in one of the first and second clamping positions, deforms the spring arrangement to exert a force upon the pawl link in a direction toward the axis of rotation of the rotary operating mechanism and opposite to a current switching position of the pawl link.

20. The stepping switch of claim 19 wherein the spring arrangement comprises a pair of compression springs; each one of the pair of compression springs is mounted by and acts between the pawl link and the clamping link; so that the clamping link, when in one of the first and second clamping positions, tensions one of the pair of compression springs to exert a force on the pawl link in a direction toward the axis of rotation of the rotary operating mechanism and opposite to a first one of the first and second switching positions of the pawl link and the clamping link, when in another of the first and second clamping positions, tensions the other of the pair of compression springs to exert a force on the pawl link in a direction toward the axis of rotation of the rotary operating mechanism and opposite to a second one of the first and second switching positions.

21. The stepping switch of claim 19, wherein the spring arrangement comprises an annular spring arrangement surrounding and engaging each of the pawl link and the clamping link so that, the clamping link when in one of the first and second clamping positions, abuts against, deforms and tensions the annular spring arrangement such that the tensioned annular spring arrangement engages and exerts a force upon the pawl link in a direction toward the axis of rotation of the rotary operating mechanism and opposite to a current switching position of the pawl link.

* * * * *